United States Patent
Anti et al.

(10) Patent No.: US 12,071,170 B2
(45) Date of Patent: Aug. 27, 2024

(54) TDR-BASED SYSTEM AND METHOD FOR HAND DETECTION ON A STEERING WHEEL WITH ELIMINATION OF AGING AND ENVIRONMENTAL EFFECTS

(71) Applicant: IEE INTERNATIONAL ELECTRONICS & ENGINEERING S.A., Echternach (LU)

(72) Inventors: Baptiste Anti, Hettange-Grande (FR); Laurent Lamesch, Reichlange (LU); Thomas Faber, Schweich (DE); Thomas Stifter, Trier (DE); Michael Puetz, Trier (DE); Andreas Fox, Freudenburg (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 84 days.

(21) Appl. No.: 17/914,747

(22) PCT Filed: Mar. 25, 2021

(86) PCT No.: PCT/EP2021/057851
§ 371 (c)(1),
(2) Date: Sep. 26, 2022

(87) PCT Pub. No.: WO2021/191397
PCT Pub. Date: Sep. 30, 2021

(65) Prior Publication Data
US 2023/0347964 A1 Nov. 2, 2023

(30) Foreign Application Priority Data

Mar. 26, 2020 (LU) .................... LU101716

(51) Int. Cl.
*B62D 1/04* (2006.01)

(52) U.S. Cl.
CPC .................... *B62D 1/046* (2013.01)

(58) Field of Classification Search
CPC ....................................... B62D 1/046
See application file for complete search history.

(56) References Cited

U.S. PATENT DOCUMENTS

| 2003/0189493 | A1  | 10/2003 | Klausner et al. |
| 2007/0219691 | A1* | 9/2007  | Fukuba ............... B62D 6/008 |
|              |     |         | 701/42 |

(Continued)

FOREIGN PATENT DOCUMENTS

| EP | 1292485 B1 | 2/2004 |
| FR | 3029475 A1 | 6/2016 |

(Continued)

OTHER PUBLICATIONS

International Search Report for application No. PCT/EP2021/057851, dated May 11, 2021, 3 pages.

(Continued)

*Primary Examiner* — Giovanni Astacio-Oquendo
*Assistant Examiner* — Zannatul Ferdous
(74) *Attorney, Agent, or Firm* — Reising Ethington P.C.

(57) ABSTRACT

A method of detecting a hand positioning on a steering wheel using a sensing system having an electrically conducting signal line on a rim of the steering wheel with a priori knowledge about a relation between a distance of any portion of the signal line from a reference point and information on a position on the rim, and which further includes an electric impedance change of predefined magnitude that is permanently arranged at a predefined position along the signal line, a signal voltage source, and a control and evaluation unit. From a received measurement signal traveling along the signal line and having been reflected by the electric impedance change and by another portion or por- (Continued)

tions of the signal line, a reference travel time is determined. A position or positions on the rim of the other portion or portions of the signal line can then be determined.

13 Claims, 6 Drawing Sheets

(56) References Cited

U.S. PATENT DOCUMENTS

| | | | |
|---|---|---|---|
| 2013/0166141 A1* | 6/2013 | Ryne | G01D 3/0365 701/34.4 |
| 2018/0276440 A1 | 9/2018 | Strohmann et al. | |
| 2019/0276033 A1* | 9/2019 | Fung | G06V 10/764 |

FOREIGN PATENT DOCUMENTS

| | | |
|---|---|---|
| WO | 2016096815 A1 | 6/2016 |
| WO | 2019086388 A1 | 5/2019 |

OTHER PUBLICATIONS

Written Opinion for application No. PCT/EP2021/057851, dated May 11, 2021, 6 pages.

* cited by examiner

TDR-BASED SYSTEM AND METHOD FOR HAND DETECTION ON A STEERING WHEEL WITH ELIMINATION OF AGING AND ENVIRONMENTAL EFFECTS

TECHNICAL FIELD

The invention relates to a method of detecting a hand positioning on a steering wheel, a sensing system for detecting a hand positioning on a steering wheel by carrying out such method, a steering wheel with hand positioning detection comprising such sensing system, and a software module for automatically carrying out the method.

BACKGROUND

In the field of automotive vehicle sensor application it is known to employ sensors for so-called Hands Off Detection (HOD) systems, in which one or more sensors provide information about whether a driver has his hands on a steering wheel of a vehicle or not. This information can be provided as input to an Automatic Driver Assistance System (ADAS) such as an Adaptive Cruise Control (ACC), which, based on the provided sensor signal, can alert the driver and remind him or her to take control of the steering wheel again. In particular, such HOD systems can be used in support to fulfill a requirement of the Vienna convention that the driver must remain in control of the vehicle at all times. HOD systems may as well be employed in a parking assistance system or an ADAS that is configured for evaluating a driver activity at high speed.

It is further known to employ capacitive sensors in vehicle HOD systems.

By way of example, WO 2016/096815 A1 proposes a planar flexible carrier for use in steering wheel heating and/or sensing of the presence of the driver's hand(s) on the steering wheel. The planar carrier, which can be employed for mounting on a rim of a steering wheel without wrinkles, comprises a portion of planar flexible foil of roughly rectangular shape having two longitudinal sides and two lateral sides. A length B of the lateral sides is 0.96 to 1.00 times the perimeter of the rim. A number of N cut-outs per unit length are provided on each of the longitudinal sides, wherein the cut-outs of one side are located in a staggered fashion relative to opposing cut-out portions on the opposite side. The determining of an optimum shape and size of the cut-outs is described. Further described is a heat carrier, a heating and/or sensing device and methods for their production.

Multi-zone HOD capacitive sensor systems are known in the art that comprise a plurality of distinct and independent sensing zones along the steering wheel. These HOD capacitive sensor systems are capable of distinguishing various ways of holding the vehicle steering wheel by the driver (one hand, two hands, angular position).

For instance, European patent EP 1 292 485 B1 describes a steering wheel for a vehicle, which comprises a steering ring, a hub, and at least one spoke connecting the steering ring and the hub. On the steering ring, sensors are arranged in a distributed manner along the circumference of the steering ring, extending over the entire length of the steering ring. The sensors may be configured for operating on a resistive, capacitive or inductive basis. The sensors are subdivided into a plurality of segments arranged one behind another in the longitudinal direction of the steering ring. The spacing between two segments of a sensor from one another in the longitudinal direction of the steering ring is smaller than a finger width, wherein the segments of the sensors, in the longitudinal direction of the steering ring, are shorter than a finger width. By that, the thumb and the fingers of the hand can be reliably distinguished from each other and a high spatial resolution is achieved.

Employment of other sensors has also been proposed for HOD applications. WO 2019/086388 A1 describes a system for detecting whether at least one hand of a user is on a steering wheel. The system is in general based on a time-domain reflectometry (TDR) measurement. The system comprises a signal line that extends from a first point to a second point and is disposed along at least a portion of a surface of the steering wheel. The system further includes a detection unit that is coupled to the first point. The detection unit is configured to send a time-dependent detection signal traveling along the signal line, to receive a reflected signal traveling along the signal line and to detect the presence of a hand on the surface based on the reflected signal. Apart from detecting the presence of at least one hand, the detection unit may perform a diagnosis of the signal line. For example, it can be adapted to determine an intact length of the signal line based on the reflected signal.

SUMMARY

It is therefore an object of the invention to provide a sensing system of low complexity and a method of operation that is at least capable of reliably detecting various hand positionings on a vehicle steering wheel, and whose detecting ability is unaffected by aging and environmental effects.

This object is achieved by a method of detecting a hand positioning on a steering wheel according to the claims, by a sensing system for detecting a hand positioning on a steering wheel according to the claims, and by a steering wheel with hand positioning detection according to the claims.

In one aspect of the present invention, the object is achieved by a method of detecting a hand positioning on a steering wheel by operating a sensing system. The sensing system includes at least one electrically conducting signal line, which is arranged to extend along a major part of a surface of a rim of the steering wheel with a priori knowledge about a relation between a distance of any portion of the at least one signal line from a reference point and information on a position on the rim, and which comprises an electric impedance change of predefined magnitude that is permanently arranged at a predefined position along the at least one signal line. The sensing system further includes a signal voltage source that is operatively connectable to each signal line, and a control and evaluation unit that is operatively connectable to each signal line.

The method comprises at least steps of:

by operating the signal voltage source, providing to a signal line a time-dependent measurement signal intended to be traveling along the respective connected signal line, operating the control and evaluation unit for receiving the measurement signal after being at least partially reflected by the at least one electric impedance change and by another portion or other portions of the signal line to which the measurement signal has been provided, operating the control and evaluation unit for determining a reference travel time of the measurement signal to travel between the reference point and the at least one permanently arranged electric impedance change, operating the control and evaluation unit for determining a position or positions on the rim of the portion or portions of the signal line that has or have at least partially reflected the measurement signal, and operating the control and evaluation unit for determining, based on the determined reference travel time and the a priori known relation, a position or positions on the rim of the other portion or portions of the signal line that has or have at least partially reflected the measurement signal.

The term "signal", as used throughout this application, shall be understood to mean an electric or electromagnetic signal. The phrase "major part of a surface", as used in this application, shall particularly be understood as a part that is equal to or more than 50%, more preferably more than 60%, and, most preferably, more than 70% of an area of the surface, and shall encompass a part of close to 100% or even 100% of the area of the surface. The term "(electrically) connected", as used in this application, shall particularly be understood as being electrically connected by a galvanic connection or a capacitive or inductive coupling.

In general, the method of detecting a hand positioning is based on time-domain reflectometry (TDR), and the provided time-dependent measurement signal intended to be traveling along the respective connected signal line is suitable for TDR measurements. The signal shape of the time-dependent measurement signal may depend on the specific application.

The provided time-dependent measurement signal will be traveling along the respective connected signal line and will in any case at least partially be reflected by the at least one permanently arranged electric impedance change. Further, the measurement signal will at least partially be reflected by any other impedance discontinuity along the signal line. Such impedance discontinuities can temporarily be generated by a hand or one or more fingers of the hand of an operator of the steering wheel being positioned in proximity to the signal line. The nature of the generated impedance discontinuity or impedance discontinuities is determined by the nature of the hand positioning on the steering wheel.

Advantageously, it has been discovered that a predefined absolute length of the at least one signal line combined with the predefined position of the permanently arranged electric impedance change along the at least one signal line can be used to compensate for any effects, such as aging effects or environmental effects, for instance temperature changes, which are known to alter a speed of propagation of the measurement signal on the signal line, for instance due to a temperature dependence of electric material properties, and thus may alter a travel time necessary for the measurement signal to travel between the reference point and the permanently arranged electric impedance change.

The speed of propagation of the measurement signal along the signal line is determined by the actual material properties of the signal line and internal and external conditions. With the proposed method, a current reference travel time is determined for the measurement signal to travel along a predefined absolute length of the signal line, which is given by the distance between a reference point and the predefined position of the electric impedance change along the at least one signal line. The current reference travel time can then be used as a basis for reliably determining a position or positions on the rim of other portions of the signal line that has or have reflected the measurement signal due to a hand positioning on the steering wheel. The position or positions can then be determined from the received reflected measurement signals relative or ratiometrically to the predefined absolute length, for instance by cross-multiplication.

The proposed method can allow to compensate for any effects that are able to alter the speed of propagation of the measurement signal along the signal line. Without the proposed method, a such altered speed of propagation would result in an error for determining a position of positions of a portion or portions of the signal line that has or have reflected the measurement signal due to impedance discontinuities generated by a hand or one or more fingers of the hand of the operator on the steering wheel.

With the a priori knowledge about a relation between a distance of any portion of the at least one signal line from the reference point and information on a position on the rim, the proposed method can enable to reliably determine positions of detected impedance discontinuities on the rim.

Preferably, the method further includes the steps of:

operating the control and evaluation unit for determining a hand positioning on the steering wheel based on the determined position or positions of the portion or portions of the signal line on the rim, and providing an output signal that is indicative of the determined hand positioning.

Possible hand positionings that can be determined with the proposed method may be, without being limited to, scenarios such as one hand or two hands touching and one hand or two hands grasping the steering wheel.

The provided output signal can be transmitted to the control units. For instance, it can be conveyed to an Automatic Driver Assistance Systems (ADAS) of a vehicle for serving as support for a decision on further action.

In a further aspect of the invention, a sensing system for detecting a hand positioning on a steering wheel is provided. The sensing system includes at least one electrically conducting signal line, a signal voltage source and a control and evaluation unit.

The at least one electrically conducting signal line is arrangeable to extend along a major part of a surface of a rim of the steering wheel with a priori knowledge about a relation between a distance of any portion of the at least one signal line from a reference point and information on a position on the rim. The at least one signal line comprises at least one electric impedance change of predefined magnitude that is permanently arranged at a predefined position along the at least one signal line.

The signal voltage source is operatively connectable to each signal line and is configured for providing a time-dependent measurement signal to be traveling along the respective connected signal line.

The control and evaluation unit is operatively connectable to each signal line and is configured for:

receiving the measurement signal after being at least partially reflected by the at least one permanently arranged electric impedance change and by another portion or other portions of the signal line to which the measurement signal has been provided, determining a reference travel time of the measurement signal to travel between the reference point and the at least one permanently arranged electric impedance change, and based on the determined reference travel time and the a priori known relation, determining a position or positions on the rim of the other portion or portions of the signal line that has or have at least partially reflected the measurement signal.

The phrase "configured to", as used in this application, shall in particular be understood as being specifically programmed, laid out, furnished or arranged.

The benefits described in context with the proposed method apply to the sensing system to the full extent.

The time-dependent measurement signal does not need to be a pulse signal as is often used in TDR, but can be a continuous signal as well. In preferred embodiments of the sensing system, the signal voltage source is configured for providing a pulse-shaped signal, a frequency-swept signal, a pseudo random phase-shift keyed signal or a pseudo random signal. This can provide design freedom for appropriately covering a wide range of applications.

In the case of a frequency swept sine wave, the control and evaluation unit may be configured to apply a Fast Fourier Transform (FFT) to the received reflected measurement signal. In the case of a pseudo random phase-shift keyed signal or a pseudo random signal, the control and evaluation unit may be configured to apply a cross correlation between the provided measurements signal and the received reflected measurement signal.

Preferably, the control and evaluation unit is configured for determining a hand positioning on the steering wheel based on the determined position or positions of the portion or portions of the signal line.

The proposed sensing system for detecting a hand positioning on a steering wheel can be of low complexity and can be capable of distinguishing at least between scenarios with at least one hand touching the steering wheel, no hand touching the steering wheel and at least one hand grasping the steering wheel.

Preferably, the proposed sensing system forms part of a steering wheel of an automotive vehicle. The term "automotive vehicle", as used in this patent application, shall particularly be understood to encompass passenger cars, trucks, semi-trailer trucks and buses, although application to other vehicles such as aircrafts or watercrafts is also contemplated.

In preferred embodiments of the sensing system, each signal line is designed to have a predefined uniform characteristic impedance except for the at least one permanently arranged electric impedance change of predefined magnitude. In this way, impedance discontinuities generated by the at least one permanently arranged electric impedance change or by a touch or grasp of the hand of the operator of the steering wheel stand out better against any other potential impedance disturbances.

In preferred embodiments of the sensing system, at least one signal line is designed as a microstrip line or a coplanar waveguide, either of which comprises a flexible dielectric carrier. Microstrip lines and coplanar waveguides are well-known solutions for designing electric transmission lines as signal lines with a well-defined desired uniform impedance. The flexible dielectric carrier can beneficially allow to install the signal line on the surface of the rim of the steering wheel with little wrinkling and almost unnoticeable to the operator of the steering wheel.

Preferably, the at least one permanently arranged electric impedance change is designed as a lumped electric impedance. This can allow for an easy provision of a well-defined electric impedance change in an otherwise uniform design of the signal line.

In preferred embodiments of the sensing system, the predefined magnitude of the at least one electric impedance change is different from an infinite impedance and from an impedance of zero magnitude. The predefined magnitude of the at least one electric impedance change may e.g. differ from both a magnitude of an impedance of the respective signal line and a magnitude of an average impedance generated by a hand touched positioning on the steering wheel by at least 20%. In such embodiments, the at least one permanently arranged electric impedance change can, in addition to the benefits already described, also be employed for further diagnostic features such as detecting an open connection or a short circuit of the at least one signal line.

Preferably, the at least one electric impedance change is located with regard to the reference point at an end of the respective signal line. In this way, the at least one electric impedance change can also serve as a termination of the signal line in order to avoid a full reflection of an amplitude of the measurement signal at its end.

In preferred embodiments of the sensing system, the at least one impedance change of predefined magnitude of at least one signal line is designed as an electrically open connection or an electrical short circuit arranged at an end of the respective signal line. In such embodiments, a reference travel time of the measurement signal is maximal, and a low relative error for determining the reference travel time can be achieved. Further, an amplitude of the received reflected measurement signal generated by the at least one impedance change is maximal and can readily be identified. It will be noted, that if the impedance change of predefined magnitude is designed as an electrically open connection, the predefined magnitude of the at least one electric impedance change may actually be similar to a magnitude of an impedance of the respective signal line or a magnitude of an average impedance generated by a hand touched positioning on the steering wheel.

Preferably, the at least one signal line is shaped as a meandering pattern such that a maximum lateral dimension between adjacent turning points of the meandering pattern is adapted to a circumferential length of the cross-section of the rim of the steering wheel. In this way, a total length of the signal line that is arrangeable to extend along a major part of a surface of a rim of the steering wheel can be enlarged compared to a straight shape, by which a requirement with regard to time resolution can be alleviated. Further, using a meandering pattern can make it easier to cover a major part of the surface of the rim of the steering wheel and to avoid any "dead zones", meaning areas in which a touch or even a grasp of a hand of a steering wheel operator could be undetected by the sensing system.

In preferred embodiments of the sensing system, the at least one signal line comprises a first section, which is arrangeable to extend along a major part of a surface of the rim of the steering wheel that is facing an operator of the steering wheel, and a second section, which is arrangeable to extend along a major part of a surface of the rim of the steering wheel that is facing away from the operator of the steering wheel, wherein the first section and the second section are electrically connected in series.

It is further noted herewith that the terms "first", "second", etc. are used in this application for distinction purposes only, and are not meant to indicate or anticipate a sequence or a priority in any way.

In such embodiments, a touch of only one of the surfaces of the rim of the steering wheel by a hand would generate an impedance discontinuity and, by that, a reflected signal only in either the first portion or the second portion of the signal line, whereas a grasping hand of the operator of the steering wheel would generate two reflections of the measurement signal provided to the signal line at the same position on the rim. Two reflections of the measurement signal provided to the signal line that are detected at different positions on the rim can be attributed to two hands touching the steering wheel. By that, a reliable distinction between a positioning of a touching hand or touching hands and a positioning of a grasping hand or grasping hands of the operator of the steering wheel can be accomplished in an especially easy manner.

In a further aspect of the invention, a steering wheel with hand positioning detection is provided. The steering wheel comprises an embodiment of the sensing system for detecting a hand positioning on a steering wheel as disclosed herein, wherein the at least one electrically conducting signal line is arranged to extend along a major part of the surface of the rim of the steering wheel. The benefits described in context with the sensing system apply to the proposed steering wheel to the full extent.

In particular, the proposed steering wheel is applicable with advantage in the automotive sector; i.e. for use in a vehicle. However, it is also contemplated to employ the proposed steering wheel for aircrafts and watercrafts.

In yet another aspect of the invention, a non-transitory, computer-readable medium storing a software module for controlling automatic execution of steps of an embodiment of the method disclosed herein is provided.

The method steps to be conducted are converted into a program code of the software module, wherein the program code is implementable in a digital memory unit (such as the computer-readable medium) of the sensing system for detecting a hand positioning on a steering wheel, and is executable by a processor unit of the sensing system. Preferably, the digital memory unit and/or processor unit may be a digital memory unit and/or a processing unit of the control and evaluation unit of the sensing system. The processor unit may, alternatively or supplementary, be another processor unit that is especially assigned to execute at least some of the method steps.

The software module can enable a robust and reliable execution of the method and can allow for a fast modification of method steps.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies embodiments of the invention in particular in connection with the figures.

BRIEF DESCRIPTION OF THE DRAWINGS

Further details and advantages of the present invention will be apparent from the following detailed description of not limiting embodiments with reference to the attached drawing, wherein.

DETAILED DESCRIPTION

Figure 1:
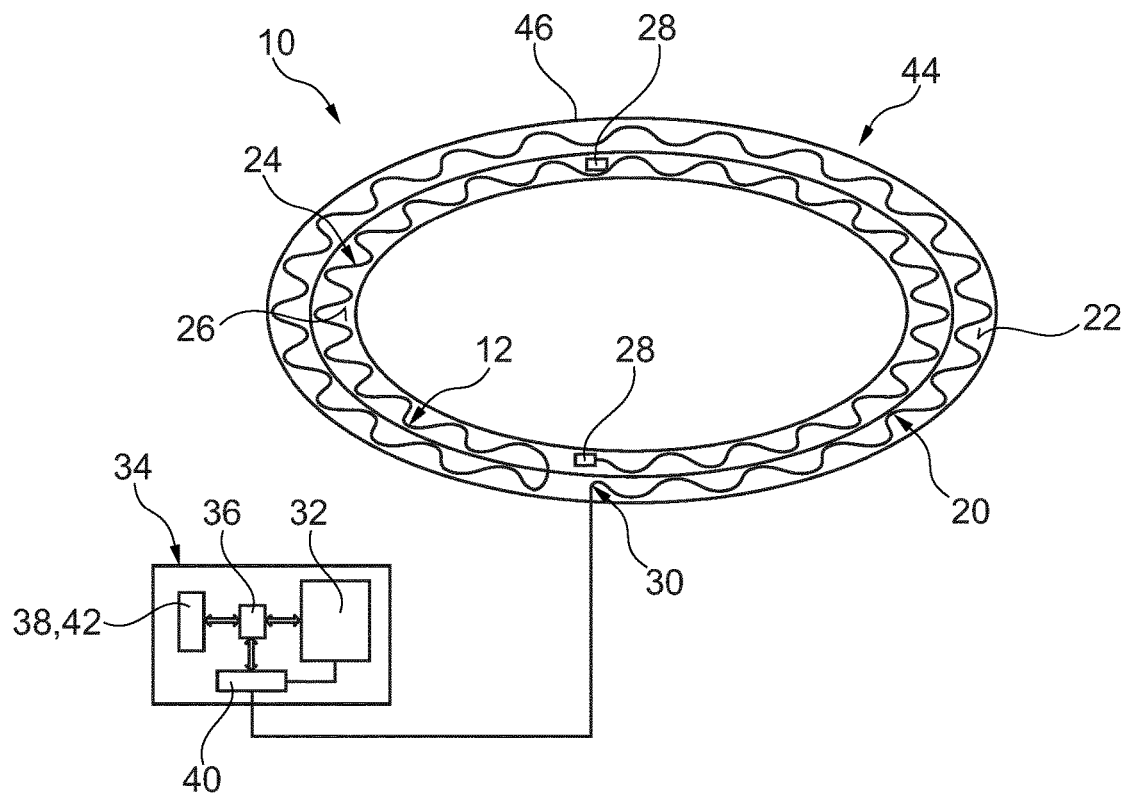
FIG. 1 schematically illustrates a sensing system in accordance with an embodiment of the invention for hand positioning detection on a steering wheel in an installed state, FIG. 2 schematically illustrates the electrically conducting signal line of the sensing system pursuant to FIG. 1, FIG. 3 schematically illustrates the sensing system pursuant to FIG. 1 in a scenario with two hands touching the steering wheel (double touch positioning)

FIG. 1 schematically illustrates a sensing system 10 for detecting a hand positioning on a steering wheel 44 in an installed state. For clarity purposes, only a rim 46 or steering ring of the steering wheel 44 is shown, which further comprises at least one spoke that connects the rim 46 to a steering column via a hub in a manner known per se. The steering wheel 44 with hand positioning detection may be employed in a vehicle designed as a passenger car, but may as well be employed in an aircraft or a watercraft.

The sensing system 10 comprises an electrically conducting signal line 12, a signal voltage source 32 and a control and evaluation unit 34.

Figure 2:
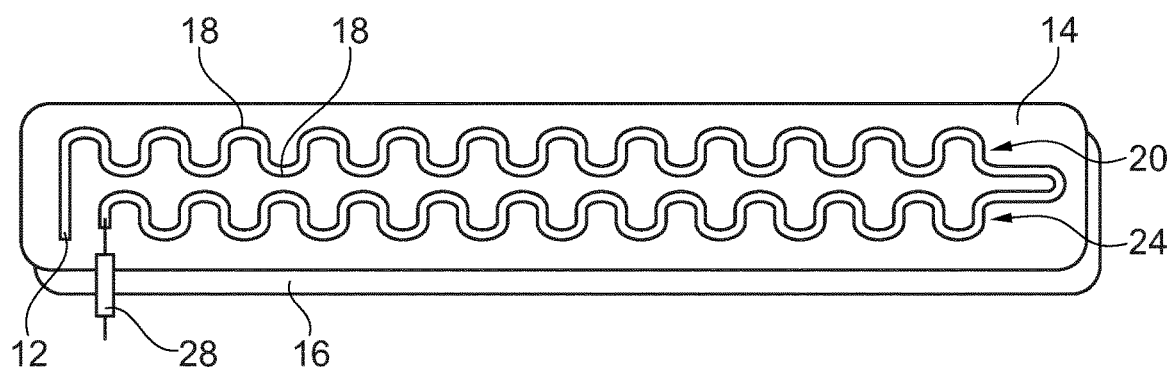

The signal line 12 of the sensing system 10 is schematically illustrated in FIG. 2. The signal line 12 may be shaped as a meandering pattern, which comprises a plurality of half-circle shaped turns connected by straight-line portions. The signal line 12 may be designed as a coplanar waveguide having an electrically conductive center line and two electrically conductive return lines, which are arranged in an equally spaced manner at both sides of the center line. The center line and the return lines may be attached to a flexible dielectric carrier 14 such as a polymeric foil, for instance by applying a screen printing method. The flexible dielectric carrier 14 is backed by an electrically conductive ground plane 16 serving as an additional return line of the coplanar waveguide.

In this way, the signal line 12 is designed to have a predefined uniform characteristic impedance, which can be laid out by varying the geometry and relative positions of the center line and the return lines, as is well known in the art, except for one electric impedance change 28 of predefined magnitude. The electric impedance change 28 is permanently arranged at a predefined position along the signal line 12. The electric impedance change 28 may be located with regard to a reference point 30 at an end of the signal line 12, as shown in FIGS. 1 and 2. In other embodiments, the electric impedance change 28 may be located at some other distance from the reference point 30 such as at a distance of three quarters of a predefined absolute length of the signal line 12, as shown in FIG. 1 with dashed lines.

The permanently arranged electric impedance change 28 may be designed as a lumped electric impedance as shown in FIG. 2, permanently arranged at the end of the signal line 12. In other embodiments, the permanently arranged electric impedance change 28 may be designed as an appropriate change of the geometrical design, i.e. the dimensions, and/or the electric material properties of the coplanar waveguide.

The predefined magnitude of the electric impedance change 28 is different from an infinite impedance and from an impedance of zero magnitude and differs from both a magnitude of an impedance of the signal line 12 and a magnitude of an average impedance generated by a hand touched positioning on the steering wheel by at least 20%. In this specific embodiment, the predefined magnitude of the electric impedance change 28 is chosen to be half of the characteristic impedance of the signal line 12. In other embodiments for other applications, however, the electric impedance change of predefined magnitude may be designed as an electrically open connection or an electrical short circuit arranged at an end of the signal line 12.

A maximum lateral dimension between adjacent turning points 18 of the meandering pattern of the signal line 12 is adapted to a circumferential length of a cross-section of the rim 46 of the steering wheel 44 such that a maximum lateral dimension between adjacent turning points 18 of the meandering pattern is more than 25% and less than 50% of a circumferential length of the cross-section of the rim 46 of the steering wheel 44, and in this specific embodiment may be about 30% of the circumferential length.

As shown in FIG. 1, the electrically conducting signal line 12 is arranged to extend along a major part of a surface of the rim 46 of the steering wheel 44. The signal line 12 comprises a first section 20, which is arranged to extend along a major part of a surface 22 of the rim 46 of the steering wheel 44 that is facing an operator of the steering wheel 44, i.e. usually the driver of the vehicle. The signal line 12 further comprises a second section 24, which is arranged to extend along a major part of a surface 26 of the rim 46 of the steering wheel 44 that is facing away from the operator of the steering wheel 44. The first section 20 and the second section 24 of the signal line 12 are electrically connected in series without an impedance discontinuity.

The signal line 12 is installed and arranged on the surface of the rim 46 of the steering wheel 44 with a priori knowledge about a relation between a distance of any portion of the signal line 12 from the reference point 30 and information on a position on the rim 46. A position of any portion of the signal line 12 on the rim 46 may be defined by specifying the surface, i.e. either the surface 22 facing towards the operator or the surface 26 facing away from the operator, and by specifying a center angle with respect to a zero angle position.

The signal voltage source 32 is operatively electrically connected to the signal line 12 and is configured for providing a time-dependent measurement signal to be traveling along the connected signal line 12. In this embodiment, the signal voltage source 32 is designed as an integral part of the control and evaluation unit 34, sharing the same housing for improved signal processing and control by the control and evaluation unit 34. In other embodiments, the signal voltage source 32 may be designed as a separate unit with appropriate signal and control lines to the signal line 12 and the control and evaluation unit 34.

In this specific embodiment, the signal voltage source 32 is designed for providing pulse-shaped signals, but in other embodiments, the signal voltage source may be configured for providing a frequency-swept signal, a pseudo random phase-shift keyed signal or a pseudo random signal.

The control and evaluation unit 34 is operatively electrically connected to the signal line 12 as well as to the signal voltage source 32. The control and evaluation unit 34 may comprise a microcontroller that includes a digital data memory unit 38, a processor unit 36 with data access to the digital data memory unit 38 and a control interface 40. As will be explained below, the control and evaluation unit 34 is configured for receiving the measurement signal after being partially reflected by the permanently arranged electric impedance change 28 and by another portion or other portions of the signal line 12 to which the measurement signal has been provided, for determining a reference travel time of the measurement signal to travel between the reference point 30 and the permanently arranged electric impedance change 28, for determining, based on the determined reference travel time and the a priori known relation, a position or positions on the rim 46 of the other portion or portions of the signal line 12 that has or have at least partially reflected the measurement signal, and for determining a hand positioning on the steering wheel 44, based on the determined position or positions of the portion or portions of the signal line 12.

With a predefined magnitude of the permanently arranged electric impedance change 28 that is half of the characteristic impedance of the signal line 12, a reflected amplitude of one third of the amplitude of the measurement signal is expected and can readily be identified.

Optionally, the control and evaluation unit 34 is configured for providing an output signal that is indicative of the determined hand positioning to another electronic control unit of the vehicle for support of a decision on further action.

In the following, an embodiment of the method of detecting a hand positioning on the steering wheel 44 by operating the sensing system 10 pursuant to FIG. 1 will be described with reference to FIGS. 1 and 3 to 10 and to FIG. 11, which provides a flow chart of the method. In preparation of operating the sensing system 10, it shall be understood that all involved units and devices are in an operational state and configured as illustrated in FIG. 1.

In order to be able to automatically execute the method, the control and evaluation unit 34 comprises a software module 42. The method steps to be conducted are converted into a program code of the software module 42. The program code is implemented in the digital data memory unit 38 of the control and evaluation unit 34 and is executable by the processor unit 36 of the control and evaluation unit 34. Alternatively, the software module 42 may as well reside in and may be executable by another control unit of the vehicle, and established data communication means between the control and evaluation unit 34 and the vehicle control unit would be used for enabling mutual data transfer.

Figure 11:
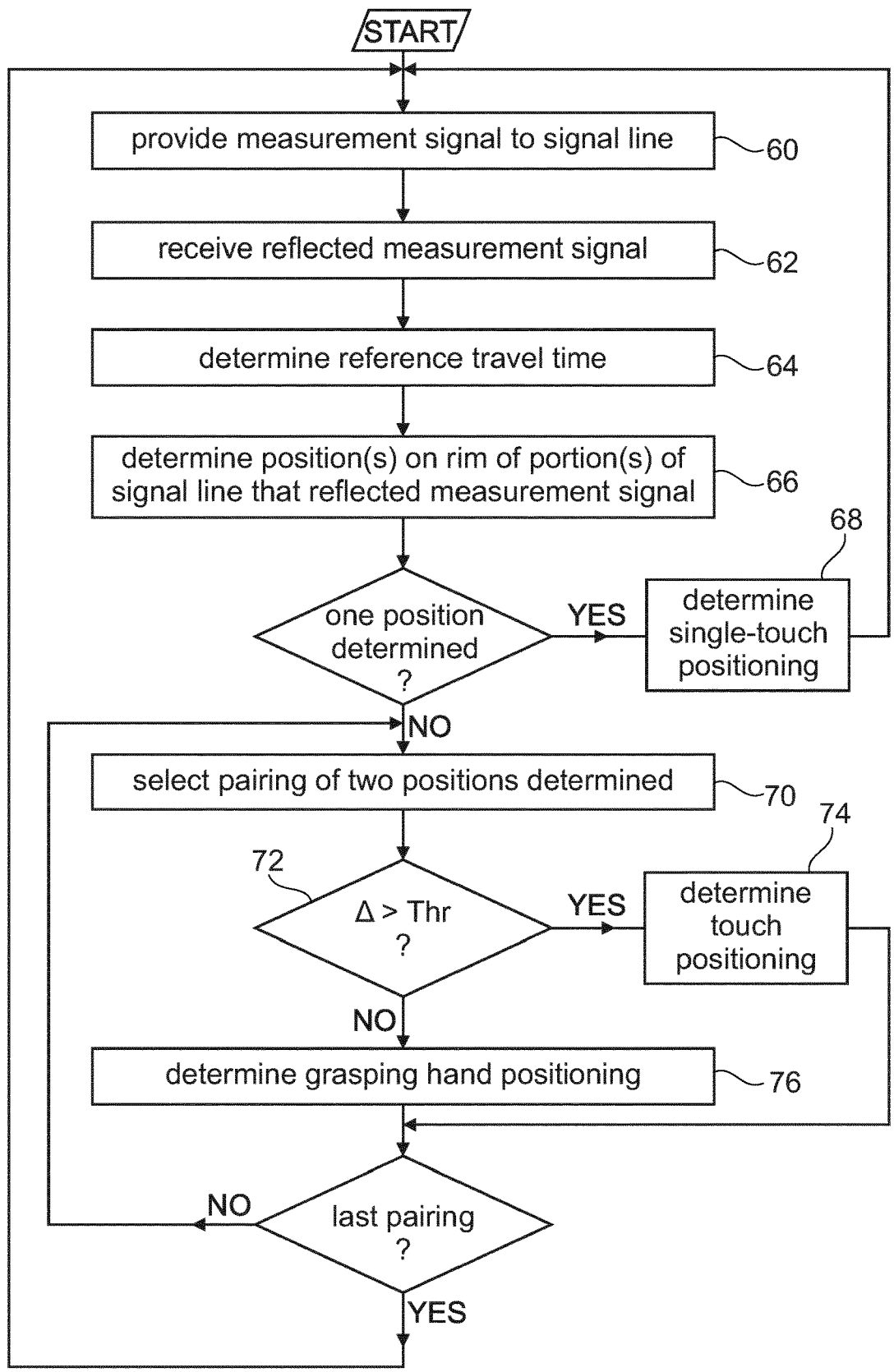
FIG. 11 is a flow chart of a method of detecting a hand positioning on a steering wheel by operating the sensing system pursuant to FIG. 1.

With reference to FIGS. 1 and 11, in a first step 60 of the method, by operating the signal voltage source 32, a time-dependent measurement signal is provided to the signal line 12. The measurement signal is intended to be traveling along the connected signal line 12. Without any hand positioning on the steering wheel 44, a reflection of one third of the amplitude of the measurement signal amplitude is expected only at the electric impedance change 28. The provision of the time-dependent measurement signal may be controlled by the control and evaluation unit 34. In other embodiments, the provision of the time-dependent measurement signal may be used as a trigger signal for the control and evaluation unit 34 for commencing execution of the following steps.

In another step 62 of the method, the control and evaluation unit 34 is operated for receiving the measurement signal after being partially reflected by the electric impedance change 28 and by another portion or other portions of the signal line 12 (also referred to as received reflected measurement signal).

In a next step 64, the control and evaluation unit 34 is operated to determine a reference travel time of the measurement signal to travel between the reference point 30 and the permanently arranged electric impedance change 28.

In a next step 66, the control and evaluation unit 34 is operated to determine, based on the determined reference travel time and the a priori known knowledge about the relation between a distance of any portion of the signal line 12 from the reference point 30 and information on a position on the rim 46, a position or positions on the rim 46 of the portion or portions of the signal line 12 that has or have at least partially reflected the measurement signal. This may be obtained by calculating the position or positions by cross-multiplication, using the determined reference travel time and the known predefined absolute length of the signal line 12, which is given by the distance between the reference point 30 and the predefined position of the electric impedance change 28 along the signal line 12.

In further steps then, the control and evaluation unit 34 is operated to determine a hand positioning on the steering wheel 44 based on the determined position or positions of the portion or portions of the signal line 12.

In case only one other position on the rim 46 of the portion of the signal line 12 that has partially reflected the measurement signal has been determined, the control and evaluation unit 34 determines 68 a hand positioning equivalent to a single-touch positioning.

Figure 3:
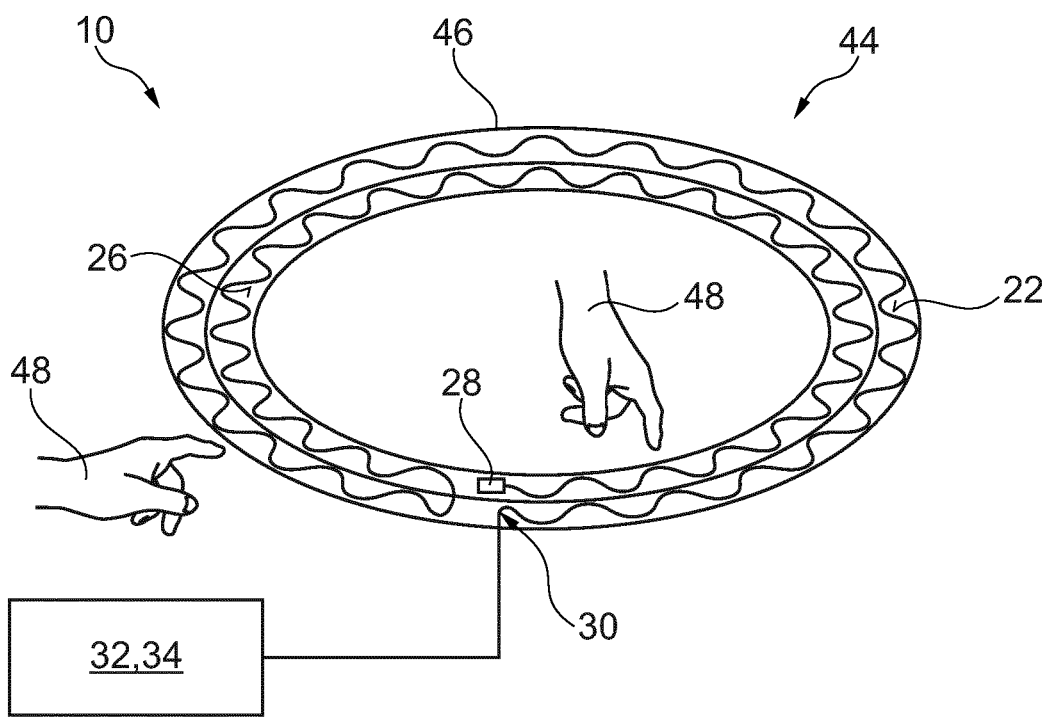

FIG. 3 schematically illustrates the sensing system 10 in a scenario with two hands 48 touching the steering wheel 44 (double touch positioning), wherein one hand 48 is touching the surface 22 of the rim 46 that is facing the operator and the other hand 48 is touching the surface 26 of the rim 46 that is facing away from the operator.

Figure 4:
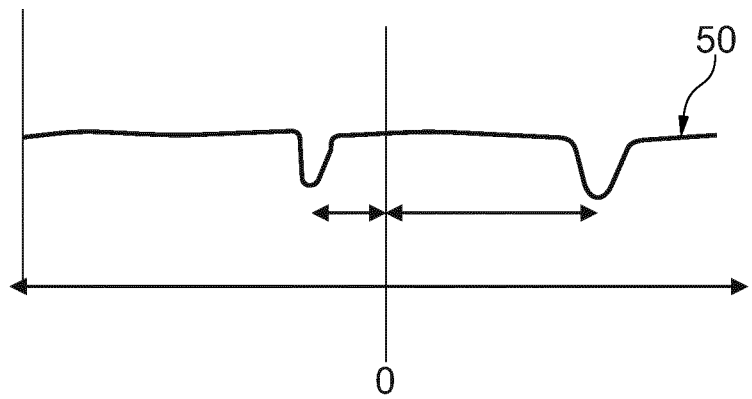
FIG. 4 is a schematic plot of reflected measurement signals received by the sensing system pursuant to FIG. 1 in the scenario pursuant to FIG. 3, FIG. 5 schematically illustrates the sensing system pursuant to FIG. 1 in a scenario with one hand grasping the steering wheel (grasping hand positioning)

FIG. 4 is a schematic plot of reflected measurement signals 50 received by the sensing system 10 pursuant to FIG. 1 in the scenario pursuant to FIG. 3. The ordinate of the plot relates to a signal amplitude, and the abscissa of the plot relates to a circumferential position on the rim 46, starting from the reference point 30 to a portion of the signal line 12, as is determined by the control and evaluation unit 34.

From the received reflected measurement signal 50, two positions of the signal line 12 that have partially reflected the measurement signal on the rim 46 have been determined and are selected as a pairing in a step 70. In a step 72 of the method, the control and evaluation unit 34 compares the first determined position on the rim 46 of the first determined portion of the signal line 12 partially reflecting the measurement signal to the second determined position on the rim 46 of the second portion of the signal line 12 partially reflecting the measurement signal.

As becomes clear from FIG. 4, the two determined positions differ. More specifically, they differ by an amount that is larger than a predefined difference threshold value $\Delta$. For this result of the step 72 of comparing, the control and evaluation unit 34 determines a hand positioning equivalent to touch positionings in another step 74.

All predefined values, threshold values and conditions mentioned herein may reside in the digital data memory unit 38 of the control and evaluation unit 34 and can readily be retrieved by the processor unit 36 of the control and evaluation unit 34.

Figure 5:
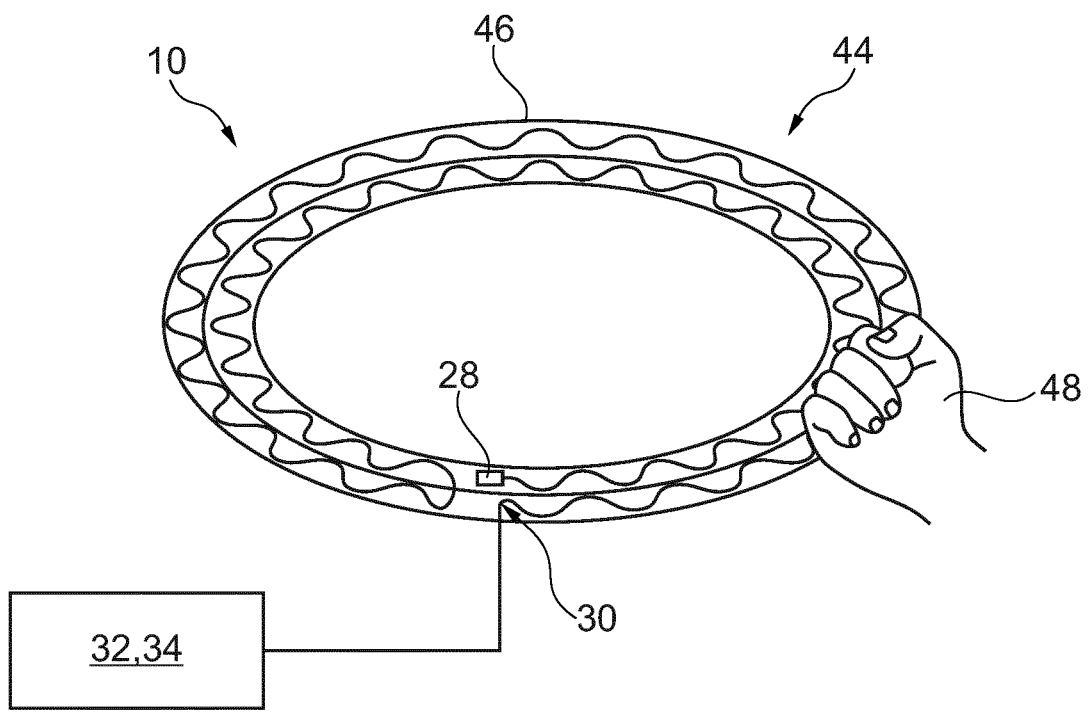
Figure 6:
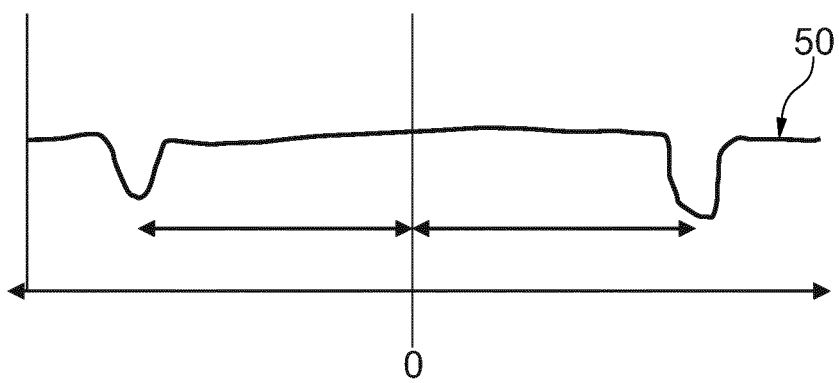
FIG. 6 is a schematic plot of reflected measurement signals received by the sensing system pursuant to FIG. 1 in the scenario pursuant to FIG. 5, FIG. 7 schematically illustrates the sensing system pursuant to FIG. 1 in a scenario with two hands grasping the steering wheel (grasping hand positioning)

FIG. 5 schematically illustrates the sensing system 10 pursuant to FIG. 1 in a scenario with one hand 48 grasping the steering wheel 44 (grasping hand positioning). Again, two positions of the signal line 12 on the rim 46 that have partially reflected the measurement signal have been determined from the received reflected measurement signal 50 (FIG. 6). In contrast to the received reflected measurement signal 50 in FIG. 4, the two positions determined match within the predefined difference threshold value $\Delta$. For this result of the step 72 of comparing, the control and evaluation unit 34 determines a hand positioning equivalent to a grasping hand positioning in another step 76.

Figure 7:
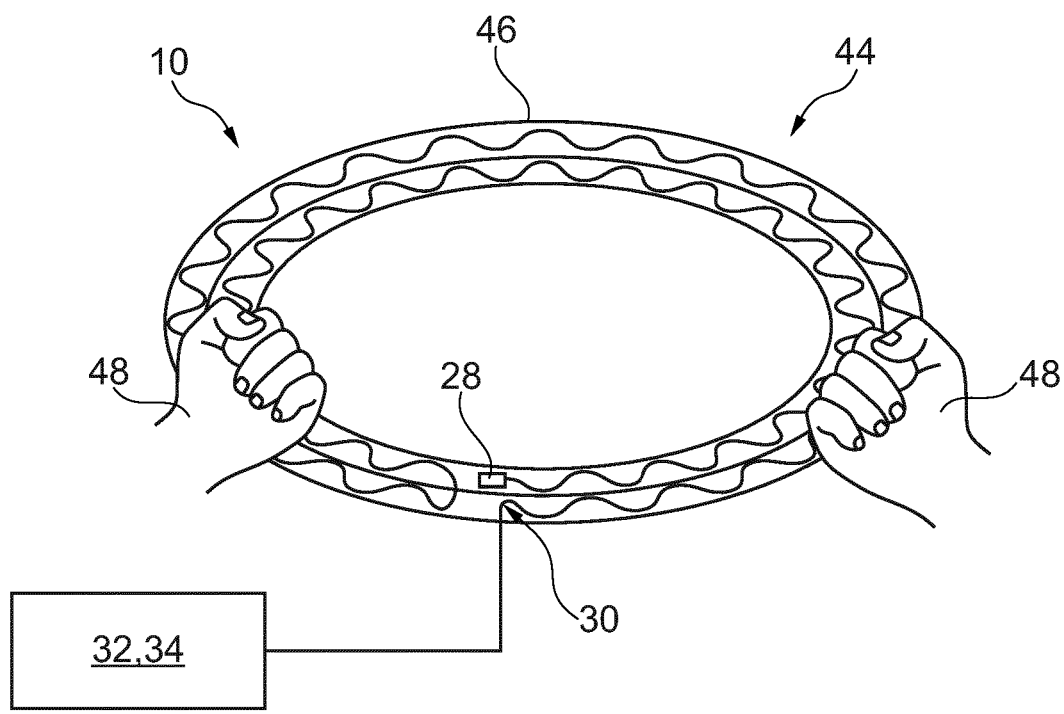
Figure 8:
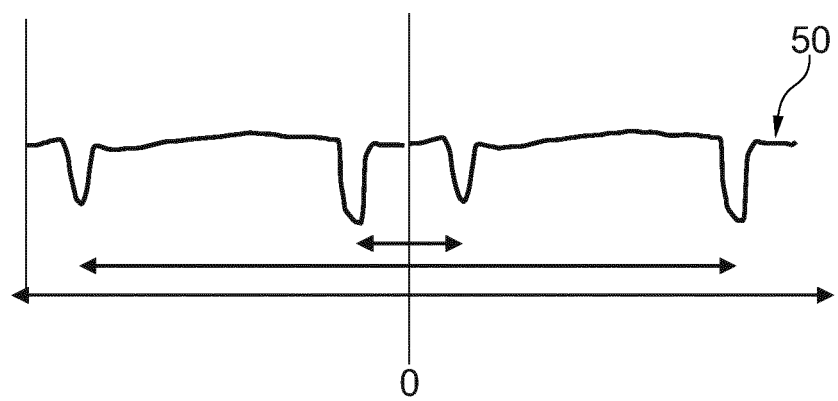
FIG. 8 is a schematic plot of reflected measurement signals received by the sensing system pursuant to FIG. 1 in the scenario pursuant to FIG. 7, FIG. 9 schematically illustrates the sensing system pursuant to FIG. 1 in a scenario with one hand touching the steering wheel and one hand grasping the steering wheel (mixed hand positioning)

FIG. 7 schematically illustrates the sensing system 10 pursuant to FIG. 1 in a scenario with two hands 48 grasping the steering wheel 44 (grasping hand positioning). FIG. 8 is a schematic plot of reflected measurement signals 50 received by the sensing system 10 pursuant to FIG. 1 in the scenario pursuant to FIG. 7.

From the received reflected measurement signal 50, four positions on the rim 46 of the signal line 12 that have partially reflected the measurement signal have been determined. As described before, in a step 70 of the method the control and evaluation unit 34 selects a pairing of a first determined position and a second determined position, compares the first determined position on the rim 46 of a first portion of the signal line 12 partially reflecting the measurement signal to the second determined position on the rim 46 of a second portion of the signal line 12 partially reflecting the measurement signal in a step 72 and determines a hand positioning based on a result of the step 72 of comparison. The step 72 of comparison is executed for all possible pairings among the four determined positions on the rim 46. If two positions determined match within the predefined difference threshold value $\Delta$, the control and evaluation unit 34 determines 76 a hand positioning equivalent to a grasping hand positioning for the pairing of positions under consideration. This is the case for two pairings of positions determined, and the control and evaluation unit 34 determines 76 a hand positioning equivalent to a grasping positioning by two hands 48.

Figure 9:
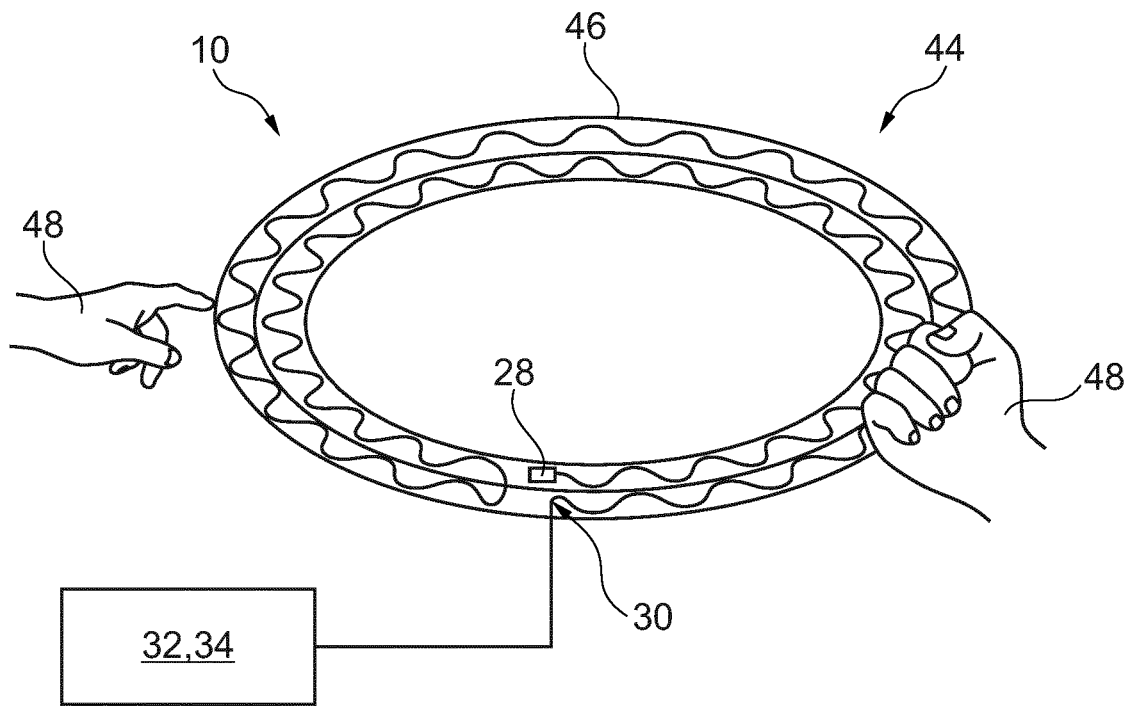
Figure 10:
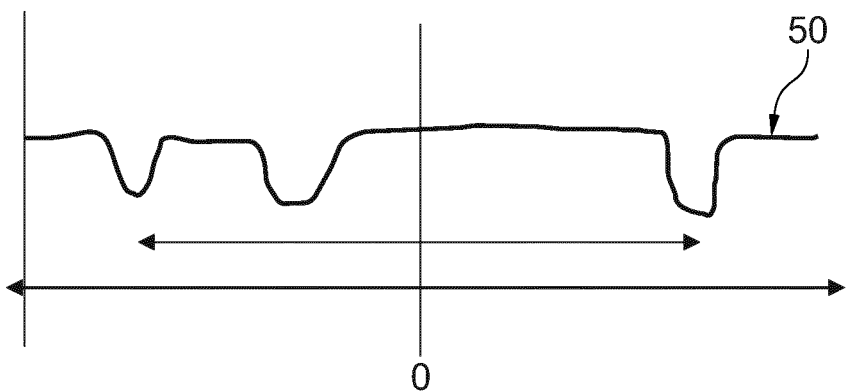
FIG. 10 is a schematic plot of reflected measurement signals received by the sensing system pursuant to FIG. 1 in the scenario pursuant to FIG. 9.

FIG. 9 schematically illustrates the sensing system 10 pursuant to FIG. 1 in a scenario with one hand 48 touching the steering wheel 44 and one hand 48 grasping the steering wheel 44, i.e. a mixed hand positioning. FIG. 10 is a schematic plot of reflected measurement signals 50 received by the sensing system 10 pursuant to FIG. 1 in the scenario pursuant to FIG. 9.

From the received reflected measurement signal 50, three positions on the rim of the signal line 12 that have partially reflected the measurement signal have been determined. As described before, in a step 70 of the method the control and evaluation unit 34 selects a pairing of a first determined position and a second determined position, and in a step 72 of the method the control and evaluation unit 34 compares the first determined position on the rim 46 of a first portion of the signal line 12 partially reflecting the measurement signal to a second determined position on the rim 46 of a second portion of the signal line 12 partially reflecting the measurement signal, and determines a hand positioning based on a result of the step 72 of comparison. The step 72 of comparing is executed for all possible pairings among the three determined positions on the rim 46.

As becomes clear from FIG. 10, two of the three positions determined match within the predefined difference threshold value $\Delta$. For these positions under consideration, the control and evaluation unit 34 determines 76 a hand positioning equivalent to a grasping hand positioning. The third of the three positions differs by an amount that is larger than the predefined difference threshold value $\Delta$ from each of the other two positions. For this result of the step 72 of comparing, the control and evaluation unit 34 determines 74 a hand positioning equivalent to a touch positioning for the third position.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A method of detecting a hand positioning on a steering wheel by operating a sensing system, comprising:
at least one electrically conducting signal line, which is arranged to extend along a major part of a surface of a rim of the steering wheel with a priori knowledge about a relation between a distance of any portion of the at least one electrically conducting signal line from a reference point and information on a position on the rim, and which comprises an at least one electric impedance change of predefined magnitude that is permanently arranged at a predefined position along the at least one electrically conducting signal line,
a signal voltage source that is operatively connectable to each electrically conducting signal line, and
a control and evaluation unit that is operatively connectable to each electrically conducting signal line, the method comprising at least steps of:
by operating the signal voltage source, providing to the electrically conducting signal line a time-dependent measurement signal intended to be traveling along the respective connected electrically conducting signal line,
operating the control and evaluation unit for receiving the time-dependent measurement signal after being at least partially reflected by the at least one electric impedance change and by another portion or other portions of the electrically conducting signal line to which the time-dependent measurement signal has been provided,
operating the control and evaluation unit for determining a reference travel time of the time-dependent measurement signal to travel between the reference point and the at least one permanently arranged the at least one electric impedance change, and
operating the control and evaluation unit for determining, based on the determined reference travel time and the a priori known relation, a position or positions on the rim of another portion or portions of the electrically conducting signal line that has or have at least partially reflected the time-dependent measurement signal.

2. The method as claimed in claim 1, further including steps of:
operating the control and evaluation unit for determining a hand positioning on the steering wheel based on the determined position or positions of the portion or portions of the signal line on the rim, and
providing an output signal that is indicative of the determined hand positioning.

3. A non-transitory, computer-readable medium having stored thereon a software module for controlling automatic execution of the method as claimed in claim 1, wherein method steps to of the method comprise a program code of the software module, wherein the program code is executable by a processor unit.

4. A sensing system for detecting a hand positioning on a steering wheel, comprising:
at least one electrically conducting signal line, which is arrangeable to extend along a major part of a surface of a rim of the steering wheel with a priori knowledge about a relation between a distance of any portion of the at least one signal line from a reference point and information on a position on the rim, wherein the at least one electrically conducting signal line comprises at least one electric impedance change of predefined magnitude that is permanently arranged at a predefined position along the at least one electrically conducting signal line,
a signal voltage source that is operatively connectable to each electrically conducting signal line and that is configured for providing a time-dependent measurement signal to be traveling along the respective connected electrically conducting signal line, and
a control and evaluation unit that is operatively connectable to each electrically conducting signal line and that is configured for:
receiving the time-dependent measurement signal after being at least partially reflected by the at least one permanently arranged the at least one electric impedance change and by another portion or other portions of the electrically conducting signal line to which the time-dependent measurement signal has been provided,
determining a reference travel time of the time-dependent measurement signal to travel between the reference point and the at least one permanently arranged the at least one electric impedance change, and
based on the determined reference travel time and the a priori known relation, determining a position or positions on the rim of another portion or portions of the electrically conducting signal line that has or have at least partially reflected the time-dependent measurement signal.

5. The sensing system as claimed in claim 4, wherein each signal line is designed to have a predefined uniform characteristic impedance except for the at least one permanently arranged electric impedance change of predefined magnitude.

6. The sensing system as claimed in claim 4, wherein at least one signal line is designed as a microstrip line or a coplanar waveguide, either of which comprises a flexible dielectric carrier.

7. The sensing system as claimed in claim 4, wherein the at least one permanently arranged electric impedance change is designed as a lumped electric impedance.

8. The sensing system as claimed in claim 4, wherein the predefined magnitude of the at least one electric impedance change is different from an infinite impedance and from an impedance of zero magnitude.

9. The sensing system as claimed in claim 4, wherein the at least one electric impedance change is located with regard to the reference point at an end of the respective signal line.

10. The sensing system as claimed in claim 4, wherein the at least one electric impedance change of predefined magnitude of at least one signal line is designed as an electrically open connection or an electrical short circuit arranged at an end of the respective signal line.

11. The sensing system as claimed in claim 4, wherein the at least one signal line is shaped as a meandering pattern such that a maximum lateral dimension between adjacent turning points of the meandering pattern is adapted to a circumferential length of the cross-section of the rim of the steering wheel.

12. The sensing system as claimed in claim 4, wherein the at least one signal line comprises a first section, which is arrangeable to extend along a major part of a surface of the rim of the steering wheel that is facing an operator of the steering wheel, and a second section, which is arrangeable to extend along a major part of a surface of the rim of the steering wheel that is facing away from the operator of the steering wheel, wherein the first section and the second section are electrically connected in series.

13. A steering wheel with hand positioning detection, comprising a sensing system as claimed in claim 4, wherein the at least one electrically conducting signal line is arranged to extend along a major part of a surface of a rim of the steering wheel.

* * * * *